United States Patent
Cohn et al.

(10) Patent No.: US 8,830,821 B2
(45) Date of Patent: Sep. 9, 2014

(54) METHOD FOR SUPPORTING MPLS TRANSPORT PATH RECOVERY WITH MULTIPLE PROTECTION ENTITIES

(75) Inventors: Daniel Cohn, Raanana (IL); Rafi Ram, Herzliya (IL)

(73) Assignee: Orckit-Corrigent Ltd., Tel Aviv (IL)

( * ) Notice: Subject to any disclaimer, the term of this patent is extended or adjusted under 35 U.S.C. 154(b) by 324 days.

(21) Appl. No.: 13/311,128

(22) Filed: Dec. 5, 2011

(65) Prior Publication Data

US 2012/0327762 A1  Dec. 27, 2012

Related U.S. Application Data

(60) Provisional application No. 61/499,943, filed on Jun. 22, 2011.

(51) Int. Cl.
 *H04J 1/16* (2006.01)
 *H04L 12/28* (2006.01)

(52) U.S. Cl.
 USPC ........... 370/217; 370/219; 370/227; 370/228; 370/392

(58) Field of Classification Search
 USPC .................. 370/219, 227–228, 392
 See application file for complete search history.

(56) References Cited

U.S. PATENT DOCUMENTS

| | | | |
|---|---|---|---|
| 6,314,093 B1 | 11/2001 | Mann et al. | |
| 7,561,534 B2 | 7/2009 | Alicherry et al. | |
| 7,961,602 B2 * | 6/2011 | Tochio | 370/227 |
| 2005/0185654 A1 | 8/2005 | Zadikian et al. | |
| 2007/0064702 A1 * | 3/2007 | Bates et al. | 370/392 |
| 2010/0157794 A1 * | 6/2010 | Nakash | 370/228 |
| 2010/0309778 A1 * | 12/2010 | Young | 370/219 |

OTHER PUBLICATIONS

S. Bryant, et al; MPLS-TP Linear Protection; Nokia Siemens Networks, Html markup produced by rfcmarkup 1.104, available from http://tools.ietf.org/tools/rfcmarkup/; Jun. 2, 2011.

Haiyan Zhang et al; Linear Protection Switching in MPLS-TP; Telecom Italia; Html markup produced by rfcmarkup 1.104, available from http://tools.ietf.org.tools/rfcmarkup/; Jul. 12, 2010.

* cited by examiner

*Primary Examiner* — Jung Park
*Assistant Examiner* — Chuong M Nguyen
(74) *Attorney, Agent, or Firm* — Peter A. Nieves; Sheehan Phinney Bass + Green PA

(57) ABSTRACT

A system and method for selecting MPLS network transport entities between a first endpoint and a second endpoint are presented. Working and protection entities are selected from a set of available entities based upon minimizing the probability of simultaneous failure and/or minimizing a cost function base upon one or more metrics.

20 Claims, 6 Drawing Sheets

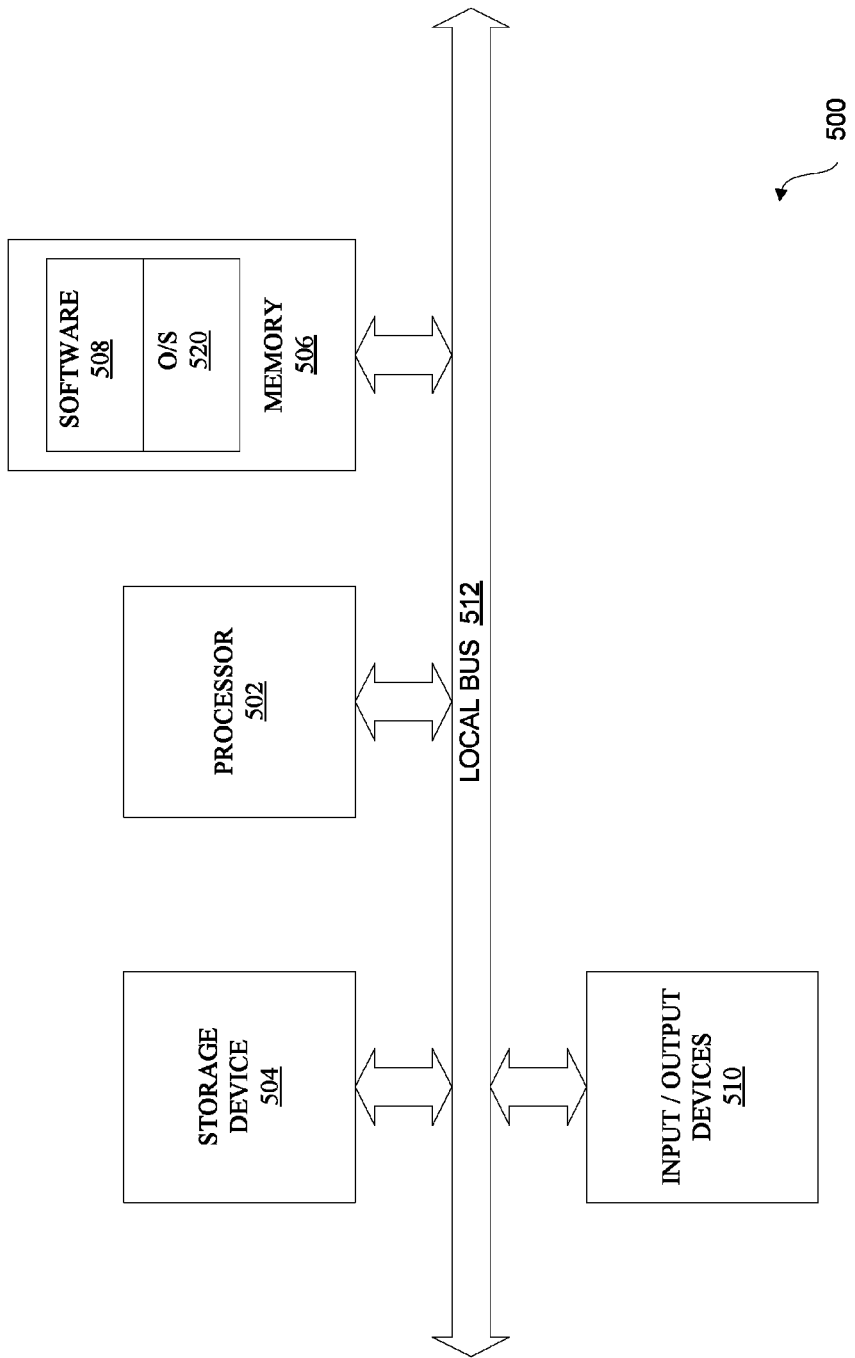

METHOD FOR SUPPORTING MPLS TRANSPORT PATH RECOVERY WITH MULTIPLE PROTECTION ENTITIES

CROSS-REFERENCE TO RELATED APPLICATIONS

This application claims the benefit of U.S. Provisional Patent Application Ser. No. 61/499,943, filed Jun. 22, 2011, entitled "Method for Supporting MPLS Transport Path Recovery with Multiple Protection Paths," which is incorporated by reference herein in its entirety.

FIELD OF THE INVENTION

The present invention relates to telecommunications and more particularly, is related to high availability of telecommunication entities.

BACKGROUND OF THE INVENTION

Availability of network connections has been the focus of increasing interest in the telecommunications field. In particular, the practice of maintaining redundant network devices and connections has become commonplace. Under the practice of redundancy, when a failure is detected in a network device or connection, network traffic is switched to a standby network device or connection. While some data may be lost in the switch-over process, most network protocols, for example TCP/IP, have integral recovery mechanisms, such as retransmission of dropped packets, that are intended to minimize disruption of network traffic during a switch-over from active to standby equipment or connections. If the disruption is brief, these recovery mechanisms will maintain network connections. However, if the disruption is more prolonged, connections may drop.

The multiprotocol label switching-transport profile (MPLS-TP) framework requires support of the transport entity or trail recovery. For example, in the event of a span or a node failure of a label switch path (LSP), pseudowire (PW) or sub network connection (SNC), the entity should recover within 50 ms of the failure. This is known as a sub-50 ms recovery, or a sub-50 ms traffic hit. References to a transport entity in this document are applicable to LSP, PW and SNC.

Several MPLS-TP mechanisms exist to accomplish a sub-50 ms node or span failure recovery by defining a second transport entity, the protection entity, between the same endpoints as the original entity, the working entity, where the working and protection entities do not share the span or nodes against whose failure protection is required. When a failure is detected at the working entity, the endpoints switch traffic to the protection entity. Traffic recovery is expected to occur within 50 ms of fault detection. These mechanisms rely on proactive connectivity verification between the endpoints for fast failure detection, and support both 1:1 and 1+1 protection architectures.

Examples of such mechanisms can be found in IETF draft-ietf-mpls-tp-linear-protection, IETF draft-zulr-mpls-tp-linear-protection-switching, and ITU-T G.8131 T-MPLS Linear Protection. However, in network environments where span or node failure likelihood is relatively high, existing MPLS-TP linear protection mechanisms may not meet operator availability requirements since they may not protect against one or several failures affecting both the working entity and the protection entity. To overcome the abovementioned shortcomings and meet operator requirement in such an environment, there is a need for a protection mechanism to provide sub-50 ms recovery in the event of a failure in any of the transport entities.

SUMMARY OF THE INVENTION

Embodiments of the present invention provide a method for supporting MPLS transport entity recovery with multiple protection entities. Briefly described, a first aspect of the present invention is directed to an entity selection method by an MPLS network device. The method includes the steps of providing a plurality of MPLS transport entities between a first endpoint and a second endpoint, determining an overall cost for each pair of entities of the plurality of entities, selecting a pair of entities from the plurality of transport entities based at least in part upon the entity pair cost, and if an entity pair reselection event occurs, reselecting the entity pair. The entity pair reselection event may be one of the following events: adding an entity, removing an entity, an operational status change in one of the entities, and an entity cost change.

The method of the first aspect may further include the steps of selecting a working entity from the plurality of transport entities, selecting a protection entity from the plurality of transport entities, and selecting an active entity from the set consisting of the working entity and the protection entity, wherein selecting an entity further includes minimizing a cost function. The cost function may include minimizing a probability of concurrent failure of the protection entity and the working entity. The cost function may further incorporate a predefined metric, such as IGP and/or TE.

A second aspect of the present invention is directed to a system for selecting entities within an MPLS network. The system includes a data structure including a plurality of transport entity descriptors, an entity protection switch configured to switch between a working entity and a protection entity, and digital logic configured to select the working entity and the protection entity from the plurality of transport entity descriptors. The digital logic includes logic configured to determine a probability of concurrent failure of the working entity and the protection entity, and logic configured to determine an entity cost of the plurality of transport entity descriptors.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 5 is a schematic diagram illustrating an example of a system for executing functionality of the present invention.

DETAILED DESCRIPTION

Figure 1:
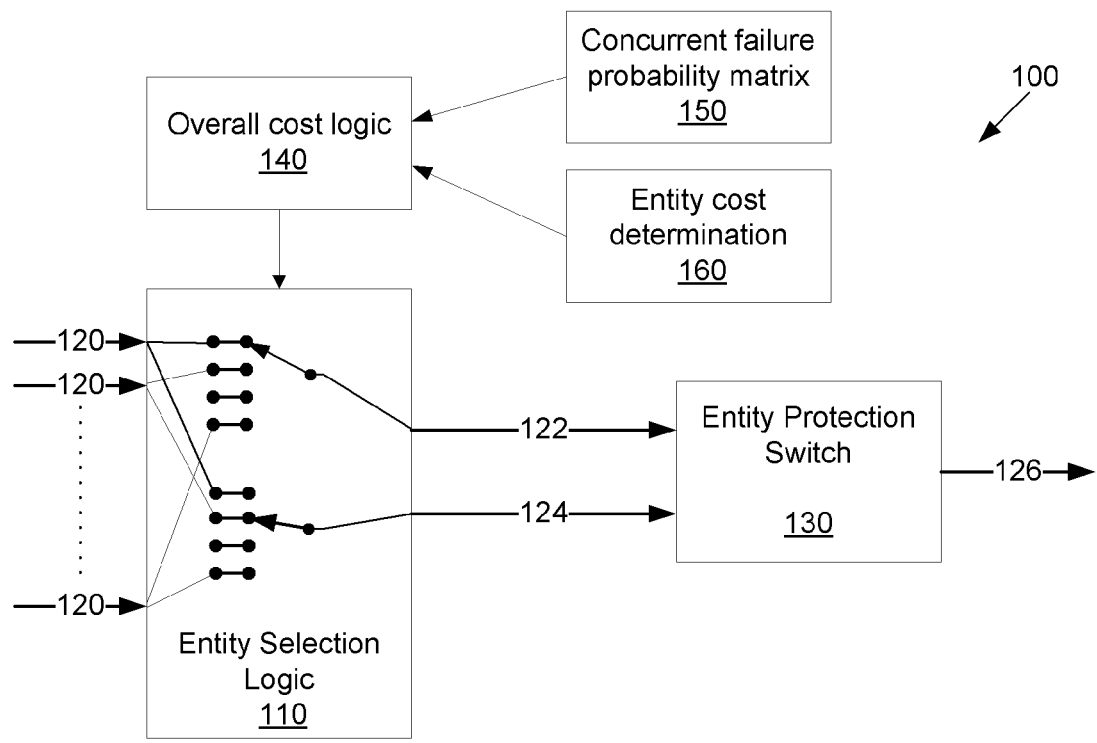
FIG. 1 is a block diagram of a first exemplary embodiment of an entity protection system.

Reference will now be made in detail to embodiments of the present invention, examples of which are illustrated in the accompanying drawings. Wherever possible, the same reference numbers are used in the drawings and the description to refer to the same or like parts.

The present invention includes a method to provide a high probability of sub-50 ms protection against multiple span or node failures, relying on multiple fully or partially resource disjoint transport entities between two endpoints. In addition, the method attempts to optimize network efficiency by minimizing the cost of an active entity. The steps for the method may make use of elements used for a MPLS-TP linear protection scheme.

An exemplary embodiment may include a network with a set of MPLS-TP transport entities, for example, label switch paths (LSPs) or pseudo wires (PWs) between a first endpoint and a second endpoint. It is preferable that an operator will define the entity set such that, with high probability, at least one entity will stay up in the event of multiple span or node failures.

A first exemplary embodiment of an entity protection system 100 is shown in FIG. 1. The first embodiment for executing the functionality may be a computer, as described below. An entity protection switch 130 switches between a working entity 122 and a protection entity 124 from a set of entities 120 or entity descriptors represented within an entity selection logic block 110. Each entity 120 represents a network route between a first endpoint and a second endpoint, and may include entity cost data associated with each entity, for example, interior gateway protocol (IGP) data, traffic engineering (TE) data, and probability of entity failure. An overall cost logic block 140 uses results from a concurrent failure probability matrix 150 and an entity cost determination block 160 to select the working entity 122 and the protection entity 124 from the set of entities 120, as described below. The concurrent failure probability matrix 150 examines the set of entities 120 and calculates the probability of concurrent failure for each entity pair. For example, a pair having multiple spans and/or nodes in common may be more likely to simultaneously fail than a pair having no spans or nodes in common. Similarly, an entity traversing a network element having a high mean-time-between-failures value may be less likely to fail than an entity traversing a network element having a low mean-time-between-failures value.

The working entity 122 and the protection entity 124 are inputs to an entity protection switch 130. The entity protection switch 130 may employ, for example, an MPLS linear protection scheme such as those defined in IETF draft-ietf-mpls-tp-linear-protection, IETF draft-zulr-mpls-tp-linear-protection-switching, and ITU-T G.8131 T-MPLS Linear Protection. However, a person having ordinary skill in the art will appreciate that other protection switching mechanisms may be employed within the scope of this disclosure. The entity protection switch 130 may select either the working entity 122 or the protection entity 124 to be the active entity 126.

Figure 2:
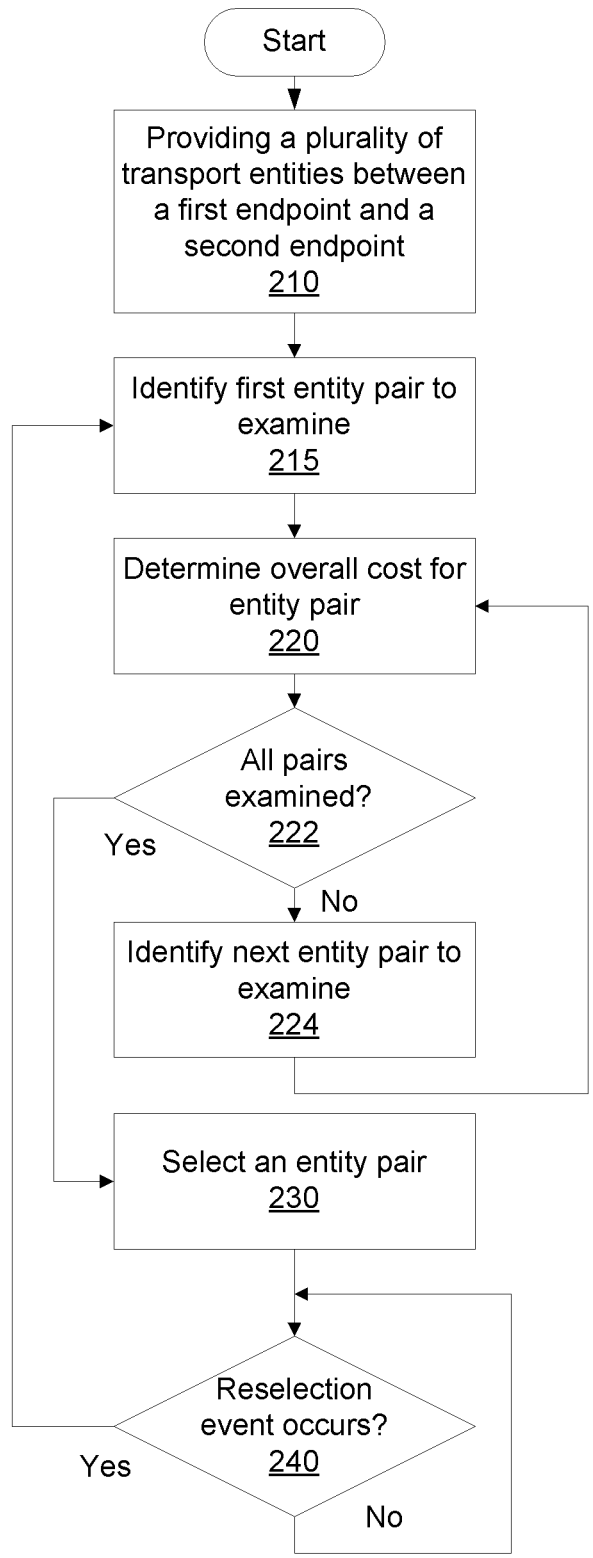
FIG. 2 is a logic flowchart for a first exemplary embodiment for an entity selection method.

FIG. 2 is a logic flowchart for a first exemplary embodiment for an entity selection method. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 4A:
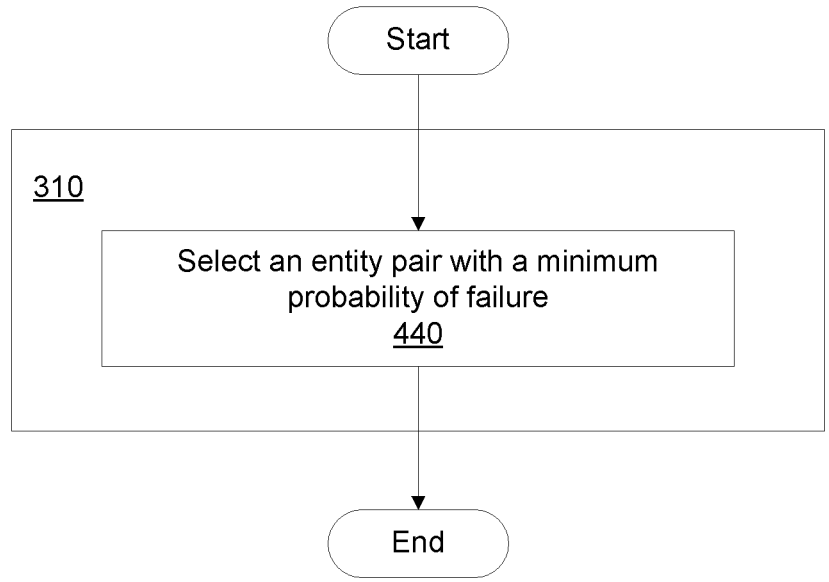
FIG. 4A is a logic flowchart of a first method for determining overall cost of an entity.
Figure 4B:
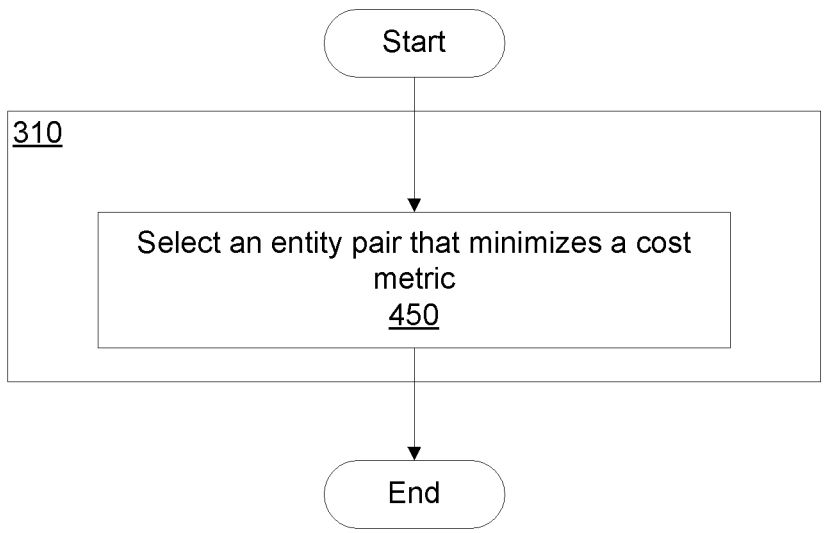
FIG. 4B is a logic flowchart of a second method for determining overall cost of an entity.
Figure 4C:
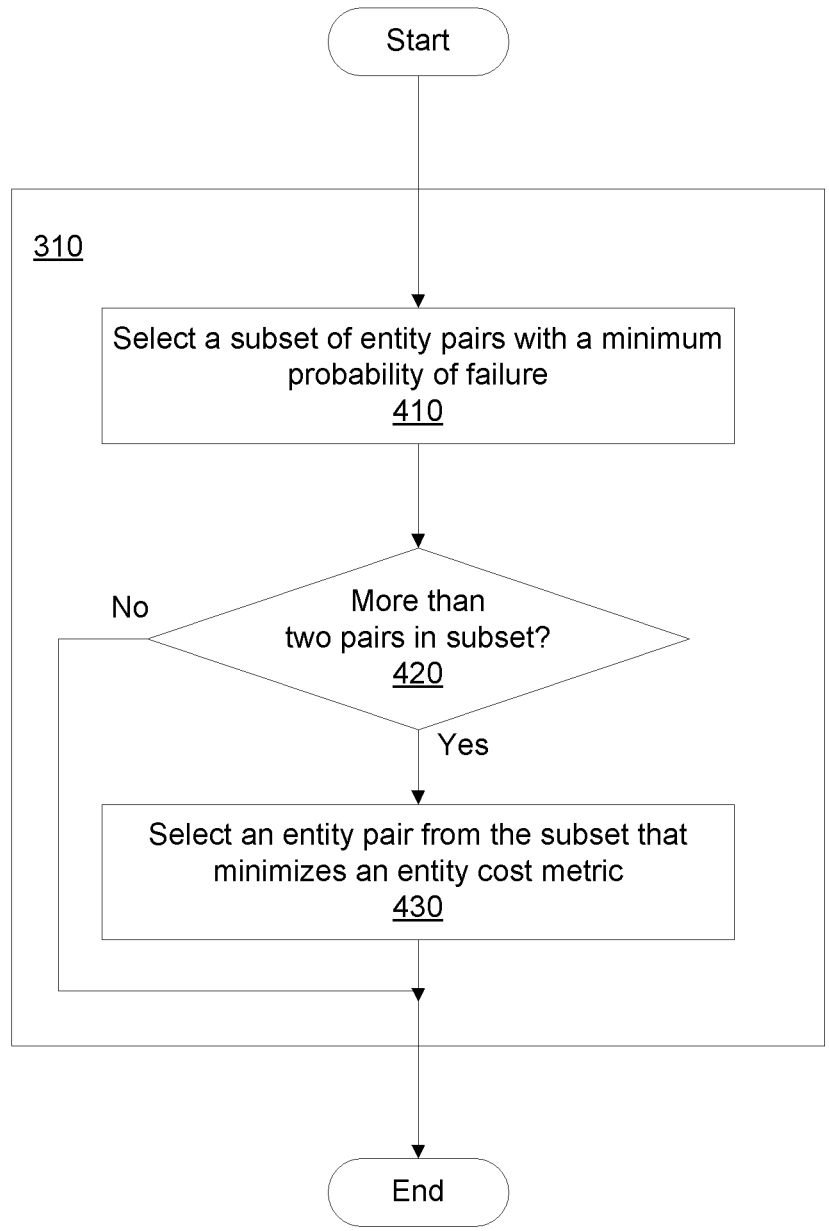
FIG. 4C is a logic flowchart of a third method for determining overall cost of an entity.

A plurality of transport entities between a first endpoint and a second endpoint are provided, as shown by block 210. Each possible entity pairing is examined for cost in turn, starting with a first entity pair, as shown by block 215. An overall cost for each pair of the plurality of transport entities is determined, as shown by block 220. The overall cost may be determined based on the probability of simultaneous failure of the working and protection entities (SFP), as described below, the entity cost, or a combination of SFP and entity cost. The entity cost may be defined as the sum of the link metrics, for example IGP or TE metrics, along the entity. Three embodiments of overall cost determination are described in more detail below (FIGS. 4A, 4B and 4C).

If all entities have not been examined, as shown by decision block 222, a next entity pairing is chosen for analysis, as shown by block 224, and the overall cost for the next entity pair is determined, as shown by block 220. If all of the entities have been examined, an entity pair is selected, as shown in block 230. The entity pair may generally be selected for several purposes, for example, each entity of the selected entity pair may be selected as a working entity, a protection entity, or an active entity, as described further below. The entity pair may be selected to minimize an overall cost, as described further below. Entity pair reselection may be triggered by an event, as shown by block 240. For example, entity pair reselection may be triggered when the operational status changes for an entity in the plurality of transport entities, when an entity is added to the plurality of transport entities, when an entity is removed from the plurality of transport entities, or due to combined cost changes in one or more entities. When entity pair reselection is triggered, the overall cost for one or more entities may be re-determined at block 220, for example, for an entity that is added to the plurality of transport entities, or for an entity in the plurality of transport entities where operational changes have occurred. Entity pair reselection may be performed, as shown by block 230, where, for example, a new working entity is selected and a new protection entity is selected.

Figure 3:
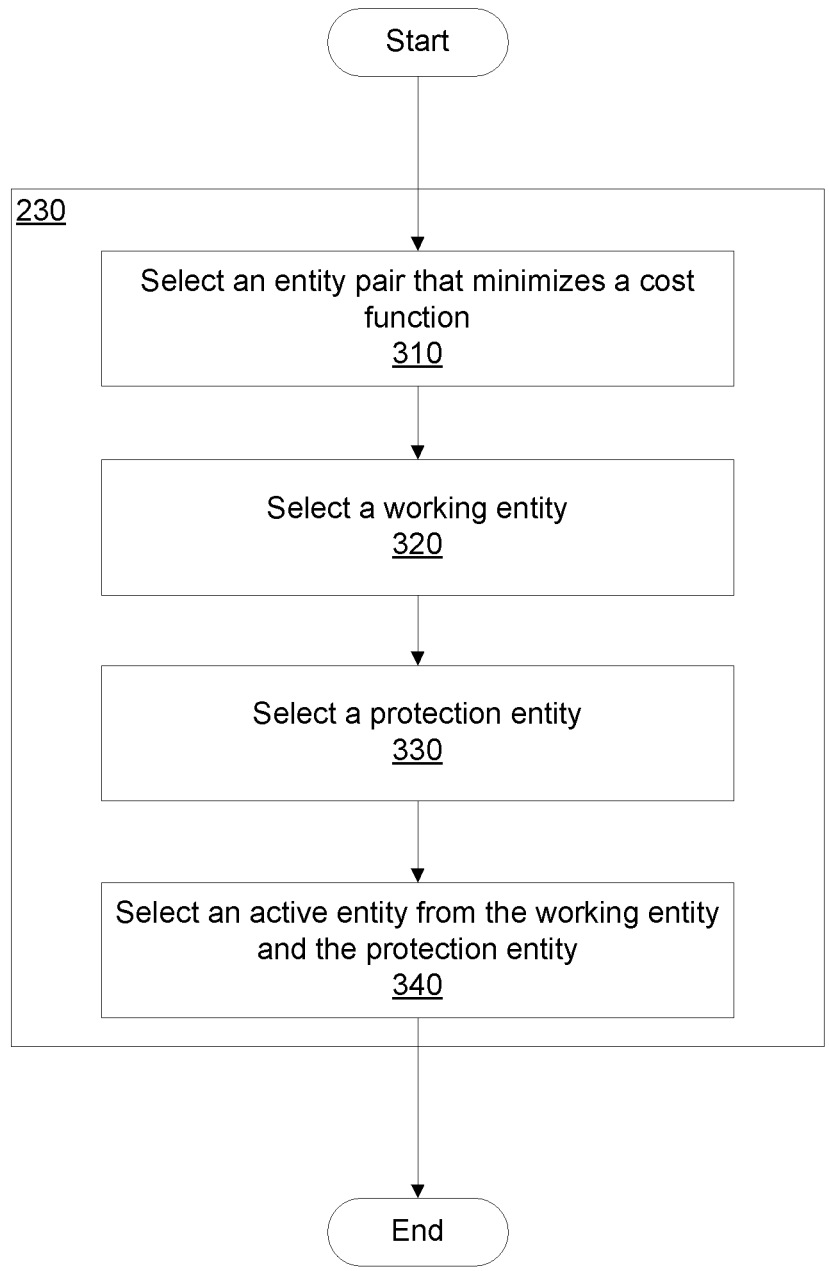
FIG. 3 is a logic flowchart expanding upon entity selection for the first exemplary embodiment for an entity selection method.

FIG. 3 is a flowchart expanding on the entity selection process as shown by block 230 (FIG. 2). An entity pair is selected, as shown by block 310. The entity pair may be selected based upon the overall cost function, as determined above, as shown by block 220 (FIG. 2). Cost functions are described further below. One entity of the entity pair may be selected as a working entity, as shown by block 320. Similarly, a protection entity may be selected from the entity pair, as shown by block 330. An active entity may be selected from the working entity and the protection entity, as shown by block 340. The protection entity may be selected before the working entity, or the working entity may be selected before the protection entity. The active entity may be selected after either or both the working entity and/or the protection entity have been selected. It should be noted that entity pair reselection, as triggered by a reselection event, may be substantially similar to initial entity selection.

Entity pair reselection may not impact traffic as long as the newly selected entity pair does not change the currently active entity. To ensure that the replaced entity is not active during entity reselection, if entity reselection results in both working and protection entities being replaced, the working entity and the protection entity may be sequentially replaced, for example, using manual commands in the MPLS-TP linear protection block. It should be noted that sequentially replacing entities preferably involves replacing a first entity and afterward replacing a second entity.

For example, in a scenario where a first working entity is selected as a first active entity and a first protection entity is selected as a standby entity, a replacement entity may be intended to supplant the first active entity. The replacement entity may be selected in place of the first protection entity, thereby becoming a second protection entity. The entity protection switch 130 (FIG. 1) may then switch to the second protection entity, designating the second protection entity as the active entity. Thereafter, the first working entity may serve as a standby entity, or may be replaced by an alternative standby entity. If desired, the active entity may then be designated as the working entity, and the alternative standby entity may be designated as the protection entity.

When a span or node failure affects only one of the selected entities, for example, the working or protection entity, traffic may be recovered in less than 50 ms by entity protection switching, for example, the MPLS linear protection scheme. When the working and protection entities fail at the same time, traffic is recovered by the entity pair reselection process. The entity pair reselection process during concurrent failure of the protection entity and the working entity may not meet the sub-50 ms traffic hit requirement, due to the calculations involved in the entity pair reselection process triggered by the entity failures or to the entity replacement process itself.

An entity selection method may generally minimize an overall cost function. The cost function for an entity pair is calculated, as shown in block 220 (FIG. 2), and an entity pair may be selected based in part upon the calculated cost function in block 310 (FIG. 3). Flowcharts expanding upon selecting a pair based upon the overall cost function of block 310 (FIG. 3) are shown by FIGS. 4A, 4B, and 4C. A first embodiment of the overall cost minimization minimizes the probability of an over-50 ms traffic hit, as shown by FIG. 4A. The entity pair may be selected based upon each entity of the pair having the lowest possible probability of individual failure. Alternatively, the entity pair may be selected to minimize the probability of a span or node failure simultaneously affecting the working and protection entities, as shown by block 440, and further described below.

A second embodiment of overall cost minimization shown in FIG. 4B, minimizes entity cost according to one or more predefined metrics (block 450), for example, interior gateway protocol (IGP) or traffic engineering (TE) data, for the selected working entity. When network efficiency optimization is desired, the MPLS linear protection block may be configured to be revertive, and therefore, in the absence of entity failures, the working entity will be active.

Since the first overall cost minimizing embodiment and the second overall cost minimizing embodiment may produce conflicting results, a third overall cost minimizing entity selection embodiment, shown in FIG. 4C, may minimize an operator-defined function of the simultaneous failure probability (SFP) and the entity cost. An example of this function would be to minimize SFP (block 410) by selecting working and protection entity pairs with the lowest SFP, and, if there are multiple pairs with the same SFP within an error margin, as shown by block 420, choosing the pair that minimizes entity IGP cost (block 430). It should be noted that the term "simultaneous failure" encompasses concurrent failures of the working and protection entities, such that the failure of the working entity and the failure of the protection entity overlap in time, but the failures do not necessarily begin at the exact same time.

The probability of simultaneous failure in entities i and j can be expressed as shown in Eq. 1, $$SFP_{ij} = \Sigma_k P(C_{ij}^k)$$ Eq. 1 where $C_{ij}^k$ is the k-th element common to entities i and j, and $P(x)$ is the element failure probability function. A metric related to the probability of an entity failure is known as the availability of the entity. Entity availability measures the probability that an end-to-end connection will survive the failure of one or more spans or nodes between the endpoints.

The probability of multiple failures affecting two entities, such that the second failure occurs before the entity pair reselection process triggered by the first failure was completed, may be considered low enough to be disregarded.

Entity elements may include spans and/or nodes. Span failure probabilities may be assigned, for example, manually by a network operator based on network knowledge. Alternatively, span failure probabilities may be automatically calculated by the network, for example, by a management entity or by the endpoints themselves, based on span parameters such as span length, which in some scenarios can be automatically detected by the endpoints, for example, based on measured received optical power. Node failure probabilities may be configured by the operator, typically based on vendor-provided mean time between failure (MTBF) parameters, and on infrastructure failure probability, for example, power failure probability.

As discussed above, entity selection logic may select a pair of entities that minimize a combined cost function, or cost logic, of the entity cost and the SFP. As shown in FIG. 1, this may be calculated by populating entries, for example, entity descriptors 120, in the entity selection logic 110, for example, containing SFP values for each entity pair as calculated by a concurrent failure probability matrix 150, and the entity cost vector 160, for example, containing entity cost for each entity, to a combined cost logic function 140 that yields a combined cost metric for each entity pair.

System

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An entity selection method performed by a network device, comprising the steps of:
   providing a plurality of multi protocol label switching (MPLS) transport entities between a first endpoint and a second endpoint;
   determining an overall cost for each entity pair of said plurality of entities;
   selecting an entity pair from said plurality of transport entities based at least in part upon said overall cost; and
   if an entity pair reselection event occurs, reselecting said entity pair from the group consisting of said entity pair and a replacement entity pair comprising at least one entity distinct from the entities of said entity pair,
   wherein said entity pair reselection event is selected from a group consisting of adding an entity to said plurality of transport entities, removing an entity from said plurality of transport entities, an operational status change for one of said plurality of transport entities, and a change in overall cost for one of said plurality of transport entities.

2. The method of claim 1, wherein said step of selecting an entity pair further comprises:
   selecting a working entity from said entity pair; and
   selecting a protection entity from said entity pair.

3. The method of claim 2, further comprising the step of selecting an active entity from the set consisting of said working entity and said protection entity.

4. The method of claim 2, wherein selecting an entity pair further comprises minimizing an overall cost function.

5. The method of claim 4, wherein said overall cost function comprises substantially minimizing a probability of concurrent failure of said protection entity and said working entity.

6. The method of claim 4, wherein said overall cost function comprises a predefined entity cost metric.

7. The method of claim 6, wherein said predefined entity cost metric is selected from the group consisting of interior gateway protocol (IGP) and traffic engineering (TE).

8. The method of claim 4, further comprising the step of configuring said working entity as revertive.

9. The method of claim 4, wherein said overall cost function comprises:
   selecting a subset of entity pairs wherein each entity pair of said subset has substantially minimum probability of a concurrent failure of said protection entity and said working entity; and
   if said subset comprises at least two entity pairs, selecting an entity pair from said subset that minimizes an entity cost function.

10. The method of claim 9, wherein said entity cost function comprises a predefined metric.

11. The method of claim 10, wherein said predefined metric is selected from the group consisting of interior gateway protocol (IGP) and traffic engineering (TE).

12. The method of claim 10, further comprising the step of configuring said working entity as revertive.

13. The method of claim 1, further comprising the step of:
   if said entity pair reselection results in both working and protection entities being replaced, sequentially replacing said working entity and said protection entity.

14. A system for selecting entities within an MPLS network, comprising:
   a data structure comprising a plurality of transport entity descriptors;
   an entity protection switch configured to switch between a working entity and a protection entity; and
   digital logic configured to select said working entity and said protection entity from said plurality of transport entity descriptors, comprising: logic configured to determine a probability of concurrent failure of said working entity and said protection entity;
   logic configured to determine an entity cost of said plurality of transport entity descriptors: and
   logic configured to reselect said working entity and said protection entity from said plurality of transport entity descriptors upon a reselection event,
   wherein said reselection event is selected from a group consisting of adding an entity to said plurality of transport entities, removing an entity from said plurality of transport entities, an operational status change for one of said plurality of transport entities, and a change in overall cost for one of said plurality of transport entities.

15. The system of claim 14 wherein said entity protection switch comprises a 1:1 switch.

16. The system of claim 14 wherein said entity protection switch comprises a 1+1 switch.

17. Non-transitory computer readable media configured to perform a method comprising the steps of:
- providing a plurality of MPLS transport entities between a first endpoint and a second endpoint;
- determining an overall cost for each entity pair of said plurality of entities;
- selecting an entity pair from said plurality of transport entities based at least in part upon said overall cost; and
- if an entity pair reselection event occurs, reselecting said entity pair from the group consisting of said entity pair and a replacement entity pair comprising at least one entity distinct from the entities of said entity pair,
- wherein said entity pair reselection event is selected from a group consisting of adding an entity to said plurality of transport entities, removing an entity from said plurality of transport entities, an operational status change for one of said plurality of transport entities, and a change in overall cost for one of said plurality of transport entities.

18. The non-transitory computer readable media of claim 17, wherein said step of selecting an entity pair further comprises:
- selecting a working entity from said plurality of transport entities;
- selecting a protection entity from said plurality of transport entities; and
- selecting an active entity from the set consisting of said working entity and said protection entity.

19. The non-transitory readable media of claim 18, wherein said step of selecting an entity pair further comprises minimizing an overall cost function.

20. The non-transitory readable media of claim 19, wherein said overall cost function comprises:
- minimizing a probability of concurrent failure of said protection entity and said working entity; and
- a predefined metric selected from the group consisting of interior gateway protocol (IGP) and traffic engineering (TE).

* * * * *